(12) United States Patent
Bonny

(10) Patent No.: US 10,323,737 B1
(45) Date of Patent: Jun. 18, 2019

(54) HYDROSTATIC TRANSAXLE

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 107 days.

(21) Appl. No.: 15/682,161

(22) Filed: Aug. 21, 2017

Related U.S. Application Data

(63) Continuation of application No. 15/205,312, filed on Jul. 8, 2016, now Pat. No. 9,739,356, which is a continuation of application No. 14/204,865, filed on Mar. 11, 2014, now Pat. No. 9,388,892.

(60) Provisional application No. 61/776,522, filed on Mar. 11, 2013.

(51) Int. Cl.
*F16D 31/02* (2006.01)
*F16H 39/06* (2006.01)
*F16H 61/4139* (2010.01)

(52) U.S. Cl.
CPC ......... *F16H 39/06* (2013.01); *F16H 61/4139* (2013.01)

(58) Field of Classification Search
CPC .................................................. F16H 61/4139
USPC ........................................................... 60/488
See application file for complete search history.

(56) References Cited

U.S. PATENT DOCUMENTS

| | | | |
|---|---|---|---|
| 1,197,789 A | 9/1916 | Bluemel | |
| 3,199,376 A | 8/1965 | De Lalio | |
| 3,360,933 A | 1/1968 | Swanson | |
| 3,765,258 A | 10/1973 | Jespersen | |
| 4,366,671 A | 1/1983 | Chichester | |
| 4,974,472 A | 12/1990 | Nishimura et al. | |
| 5,311,740 A | 5/1994 | Shiba et al. | |
| 5,555,727 A | 9/1996 | Hauser et al. | |
| 5,819,535 A | 10/1998 | Smothers | |
| 6,125,954 A | 10/2000 | Oota et al. | |
| 6,312,354 B1 | 11/2001 | Irikura et al. | |
| 6,487,857 B1 | 12/2002 | Poplawski et al. | |
| 6,530,855 B1 | 3/2003 | Folsom et al. | |
| 6,971,233 B1 | 12/2005 | Holder | |
| 7,007,468 B1 | 3/2006 | Bennett et al. | |
| 7,987,669 B2 | 8/2011 | Irikura | |
| 8,348,637 B2 | 1/2013 | Heitzler et al. | |
| 8,393,236 B1 * | 3/2013 | Hauser | F16D 55/24 74/11 |

(Continued)

FOREIGN PATENT DOCUMENTS

JP  2001318611  11/2001

*Primary Examiner* — Michael Leslie
(74) *Attorney, Agent, or Firm* — Neal, Gerber & Eisenberg LLP

(57) ABSTRACT

A transaxle for use as a drive apparatus of a vehicle is provided. The transaxle includes a main housing joined to a gear housing to enclose a transmission and a reduction gear set. The transmission includes a pump assembly and a motor assembly arranged in a parallel configuration on one side of a center section. A charge pump is contained within a pocket on an opposing side of the center section. A charge pump cover assembly secures the charge pump in the pocket and has a charge relief assembly that extends into a void volume defined by a ring gear of the gear reduction set. The gear reduction set drives an axle extending from the gear housing.

20 Claims, 8 Drawing Sheets

(56) References Cited

U.S. PATENT DOCUMENTS

| | | |
|---|---|---|
| 8,464,610 B1 | 6/2013 | Langenfeld |
| 8,528,325 B1 | 9/2013 | Hauser |
| 9,194,473 B1 * | 11/2015 | Hauser .................. B60K 17/28 |
| 9,388,892 B1 * | 7/2016 | Bonny ................ F16H 61/4139 |
| 9,739,356 B1 * | 8/2017 | Bonny ................ F16H 61/4139 |

* cited by examiner

US 10,323,737 B1

HYDROSTATIC TRANSAXLE

CROSS-REFERENCE TO RELATED APPLICATION

This application is a continuation of U.S. patent application Ser. No. 15/205,312, filed Jul. 8, 2016, which is a continuation of U.S. patent application Ser. No. 14/204,865, filed Mar. 11, 2014, which claims priority to U.S. Provisional Patent Application No. 61/776,522, filed on Mar. 11, 2013. The contents of these prior applications are incorporated herein by reference in their entirety.

BACKGROUND OF THE INVENTION

This application relates to hydrostatic transaxles generally, and in particular to hydrostatic transaxles having a center section assembly that includes a charge pump.

SUMMARY OF THE INVENTION

A hydrostatic transaxle for use as a drive apparatus of a vehicle is disclosed herein. The hydrostatic transaxle includes a main housing joined to a gear housing to enclose a hydrostatic transmission and a reduction gear set. The hydrostatic transmission includes an axial piston pump assembly and an axial piston motor assembly arranged in a parallel configuration on one side of a center section. A gerotor charge pump is contained within a pocket on an opposing side of the center section. A charge pump cover assembly secures the gerotor charge pump in the pocket and has a charge relief assembly that extends into a void volume defined by a ring gear of the gear reduction set. The gear reduction set drives an axle extending from the gear housing.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
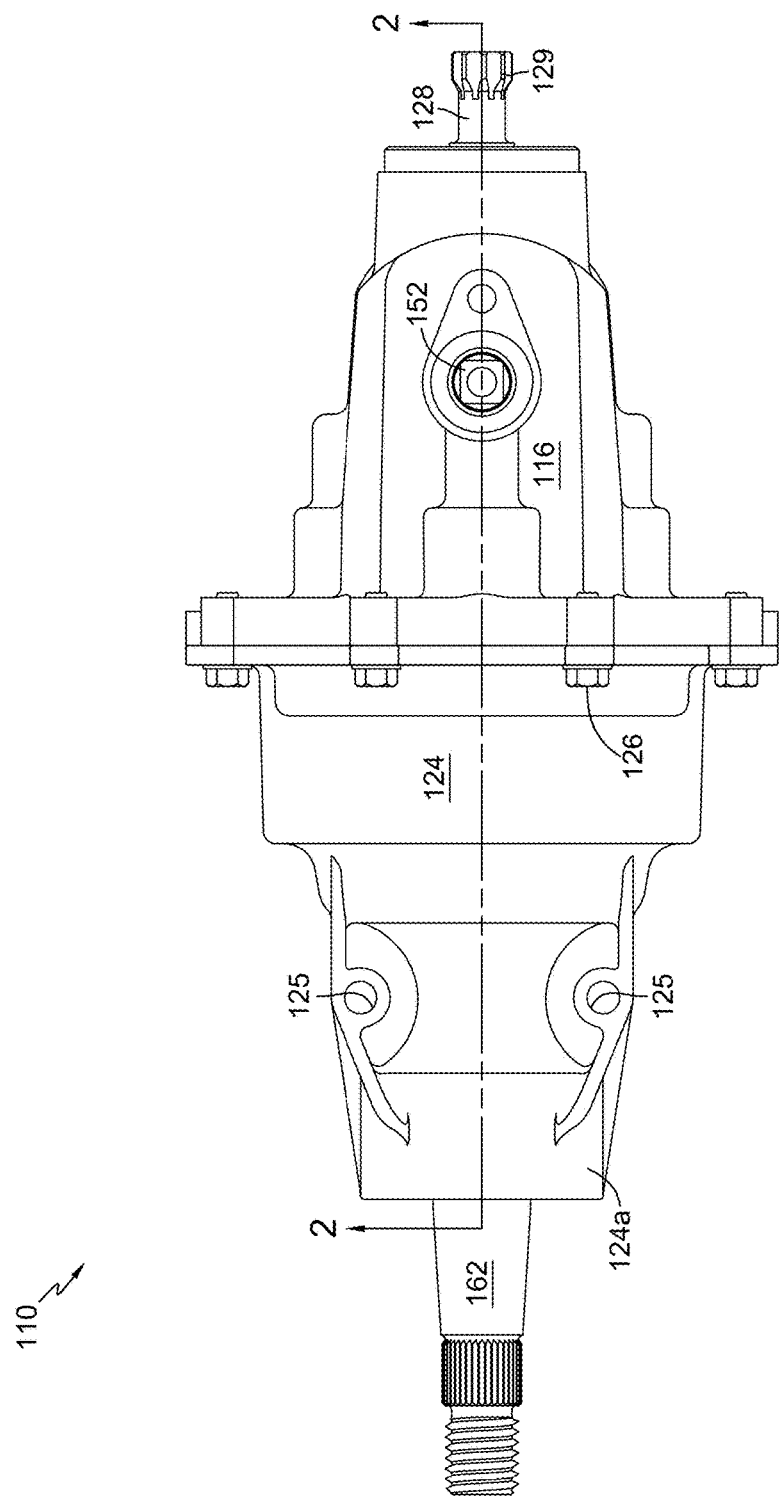
FIG. 1 is a plan view of an embodiment of a hydrostatic transaxle in accordance with the principles of the invention.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. In certain cross-sectional views, not all elements such as shafts are cross-hatched, where such cross-hatching would not assist in the understanding of the disclosure. This specification is intended to be taken as a whole and interpreted in accordance with the principles of the invention as taught herein and understood by one of ordinary skill in the art. All commonly-owned patents cited within this specification are expressly incorporated by reference herein.

FIG. 1 shows a hydrostatic transaxle 110 having a first housing member and a second housing member, namely main housing 116 with gear housing 124 fastened thereto by fasteners 126, to form a sump 161. Gear housing 124 has a plurality of mounting holes 125 by which hydrostatic transaxle 110 may be fastened to a vehicle frame (not shown). An optional return to neutral assembly (not shown) which acts on trunnion arm 152, can be mounted in part on trunnion-arm 152 and main housing 116. For example, a scissor-arm return to neutral mechanism, as illustrated in commonly-owned U.S. Pat. No. 6,487,857, incorporated by reference herein, could be used and will not be discussed further. Pump input shaft 128 has male splines 129 at the distal end thereof, that may be provided with a rounded or tapered profile to provide a flexible joint that negates the effect of vehicle frame flexion (e.g., when engaged to a drive shaft).

One application for transaxle 110 is in combination with a modular drive assembly such as that disclosed in commonly owned U.S. Pat. Nos. 8,393,236 and 9,194,473, the terms of which are incorporated herein by reference. FIGS. 2-10 show internal components of hydrostatic transaxle 110, including transmission assembly 114 comprising input shaft 128, pump assembly 132, center section 140, motor assembly 136, and motor output shaft 146. Pump assembly 132 and motor assembly 136 are arranged in a parallel configuration on one side of center section 140. The rotation of input shaft 128 is supported by bearing 160. Input shaft 128 is additionally supported by input shaft bearing surface 140*e* of center section 140. Center section 140 is attached to main housing 116 by fasteners 144 extending through mounting holes 140*j*. Center section 140 has integral hydraulic porting, namely fluid passages 142, pump kidney ports 140c, and motor kidney ports 140d to allow circulation of hydraulic fluid in a closed loop from pump assembly 132 to motor assembly 136. Center section 140 also has motor shaft bearing surface 140f to support motor shaft 146.

Figure 4:
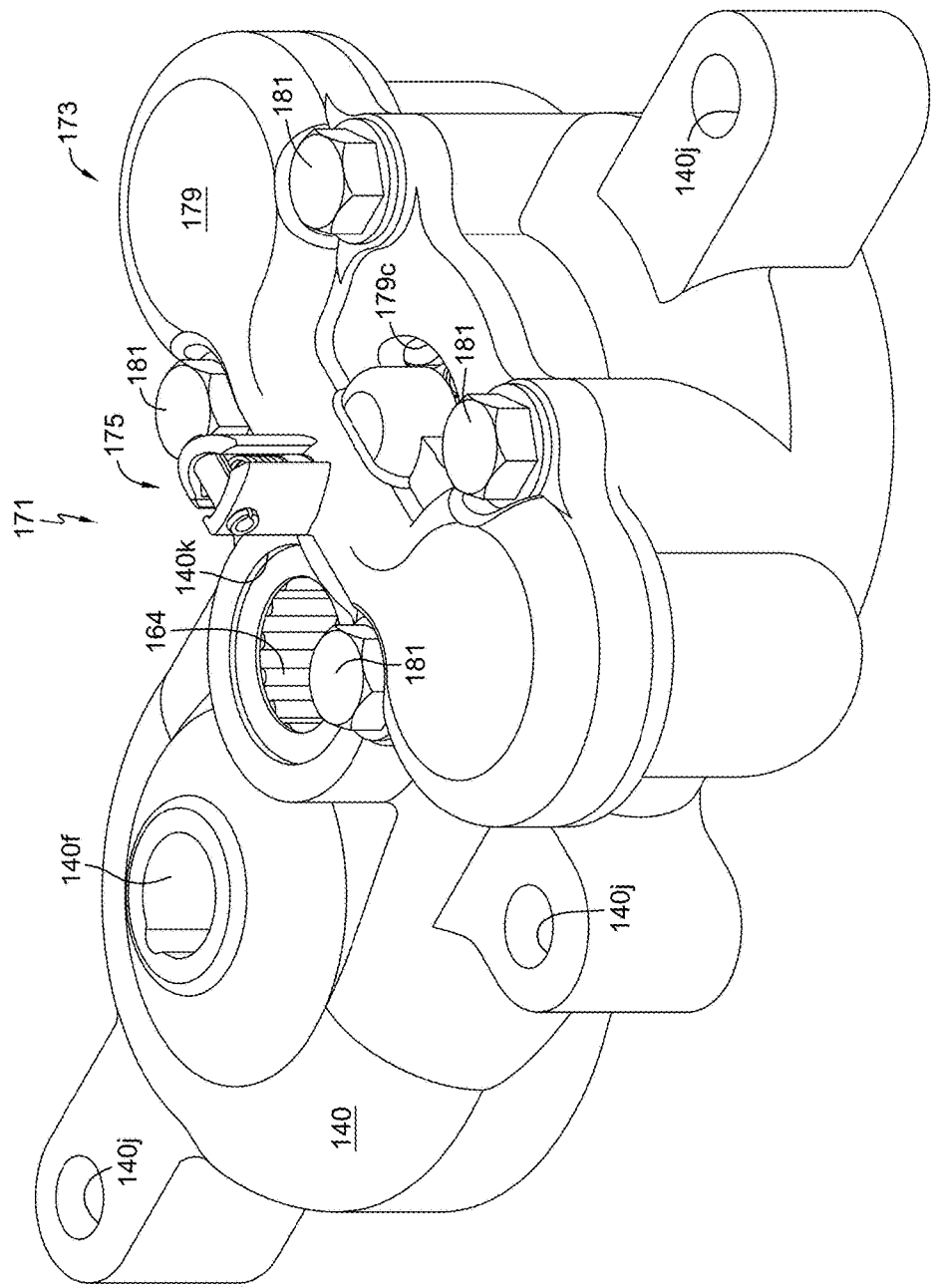
FIG. 4 is a perspective view of a center section assembly of the hydrostatic transaxle shown in FIG. 1.
Figure 5:
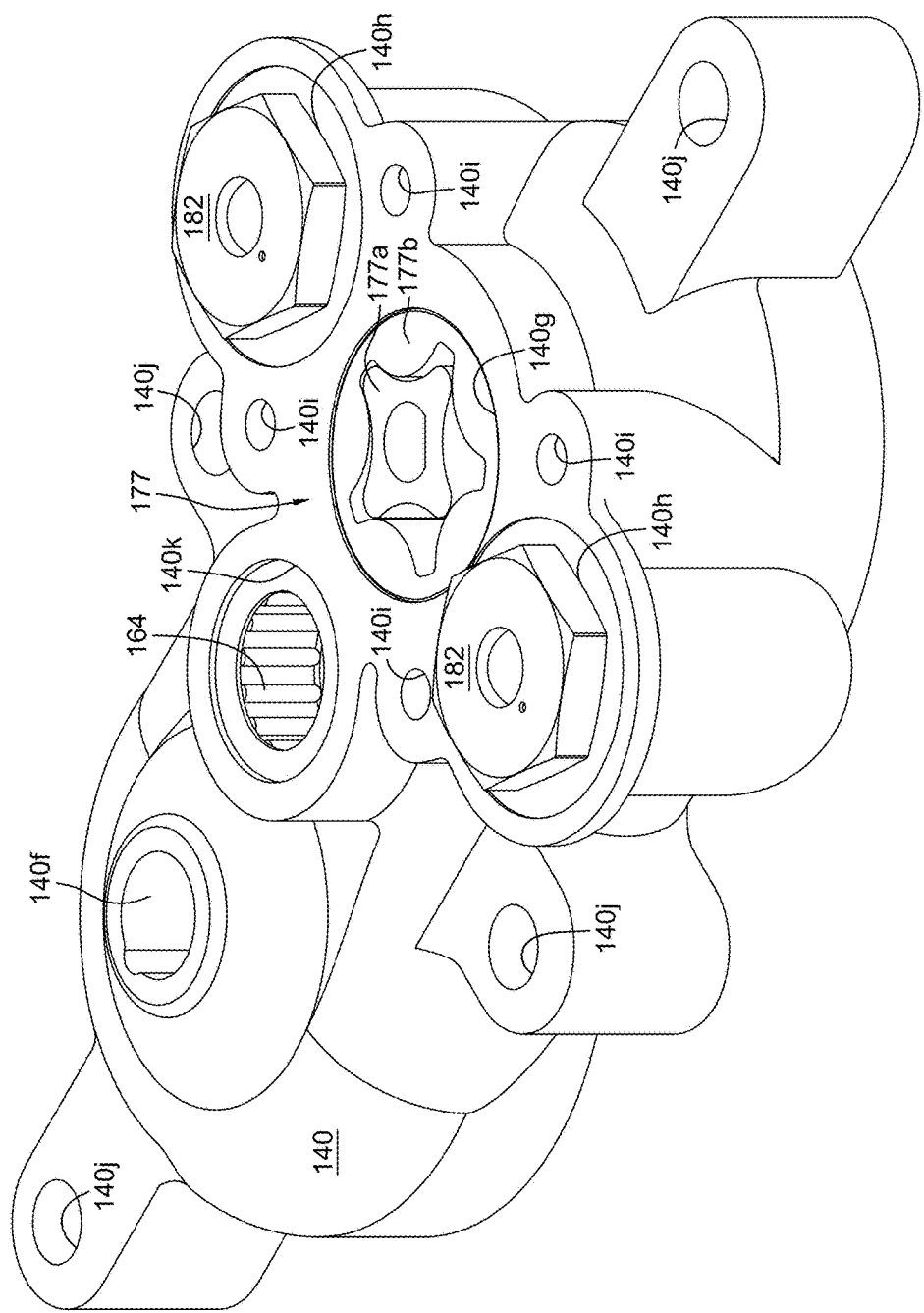
FIG. 5 is a perspective view of the center section assembly shown in FIG. 4 with a cover assembly removed for clarity.
Figure 6:
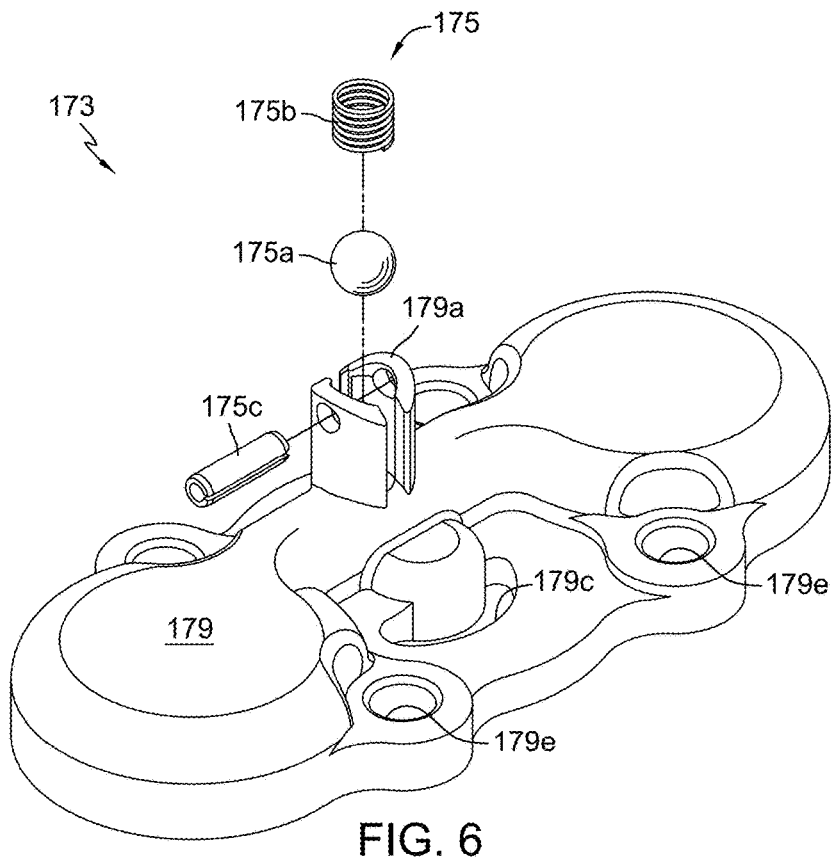
FIG. 6 is an exploded perspective view of the cover assembly shown in FIG. 4, with additional components removed for clarity.

Center section assembly 171, best seen in FIGS. 4 and 5, includes gerotor charge pump assembly 177 retained in pocket 140g of center section 140 by charge pump cover assembly 173. Gerotor charge pump assembly 177 is composed of outer rotor 177b and inner rotor 177a, which is driven by pump input shaft 128 by means of D-interface 177c that mates with D-interface 128a at the proximal end of pump input shaft 128. Charge pump cover 179, best seen in FIGS. 6 and 7, has mounting holes 179e which allow it to be secured to center section 140 by fixing fasteners 181 in mounting holes 140i. Charge pump cover 179 also has charge pump inlet 179c which allows hydraulic fluid to be drawn from sump 161 into charge gallery 179d by gerotor charge pump assembly 177. Charge gallery 179d comprises a pair of internal volumes, or ears 179h at opposite ends thereof and connected by a center passage 179i, each ear 179h being adjacent one of the check valve 182. Hydraulic charge fluid then flows into whichever of check valves 182, fixed in check valve ports 140h of center section 140, is in communication with the low pressure side of the hydraulic circuit. If trunnion arm 152 is in a neutral position, there will be no low pressure side and thus, no demand for make-up hydraulic fluid. To provide relief when necessary, charge pump cover assembly 173 includes a charge relief passage 179b formed in center passage 179i, and charge relief assembly 175 comprising ball 175a pressing against spring 175b, both of which are retained in charge relief tower 179a by pin 175c.

Figure 2:
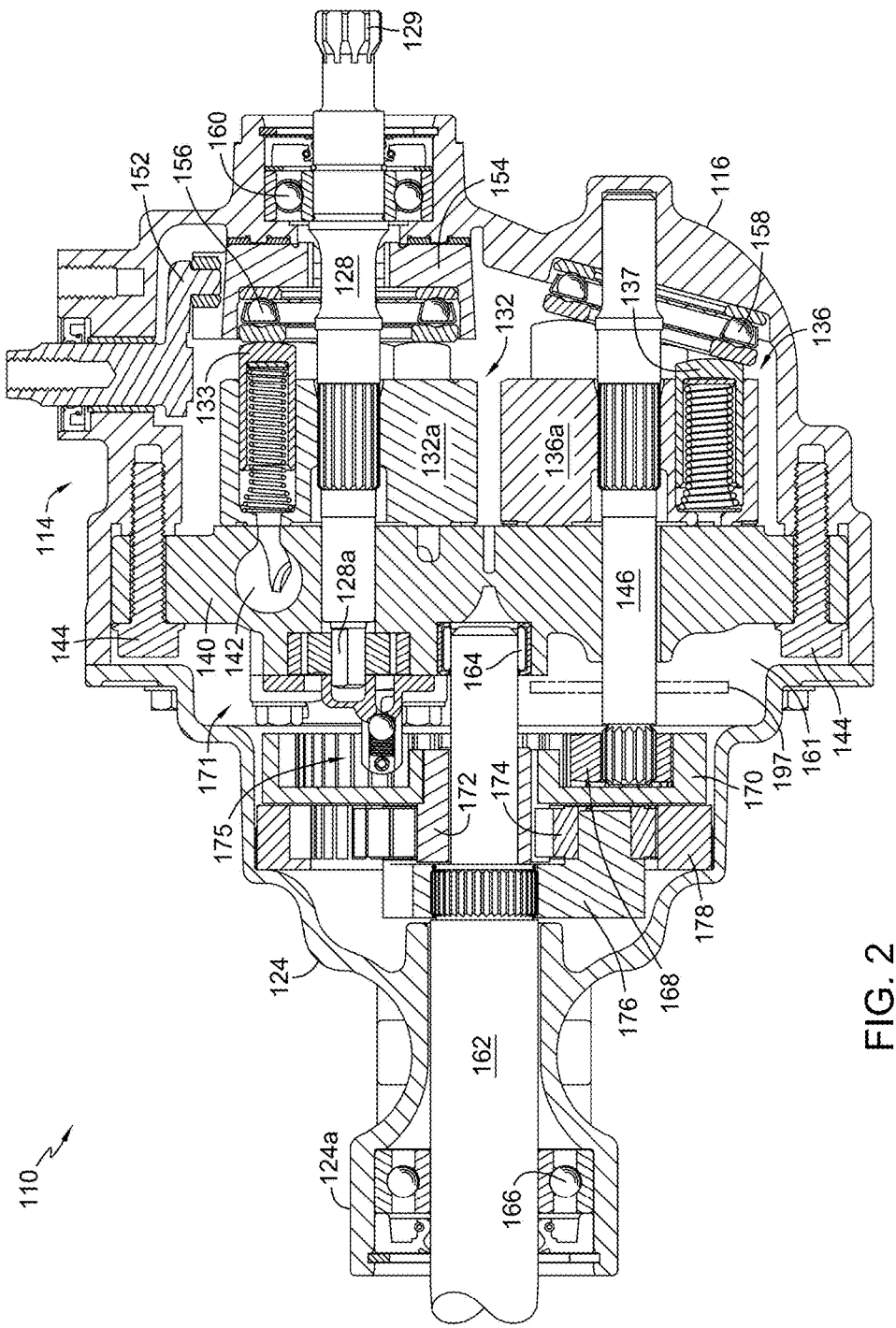
FIG. 2 is a partial cross-section of the hydrostatic transaxle shown in FIG. 1, taken along line 2-2.
Figure 3:
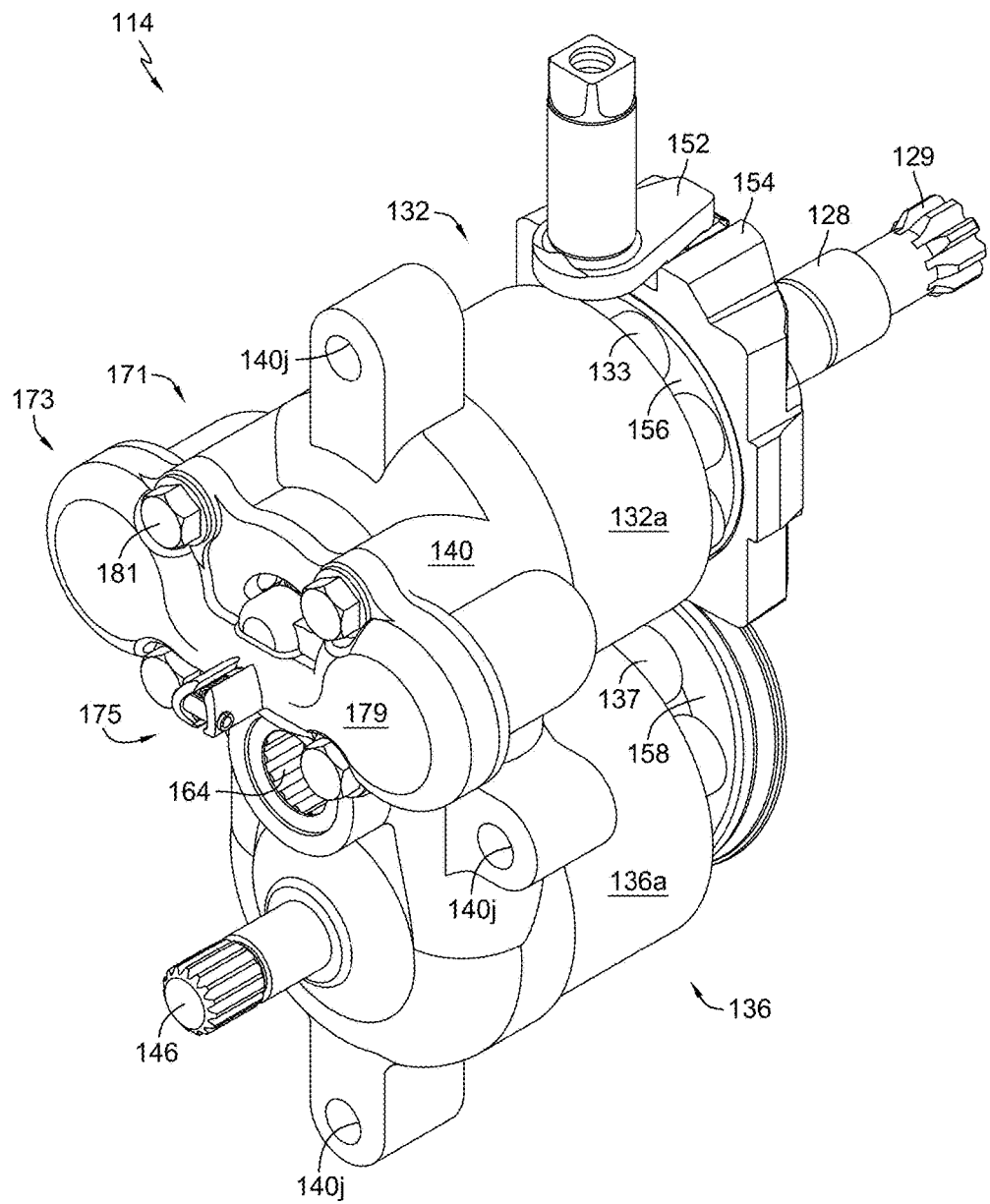
FIG. 3 is a perspective view of a hydrostatic transmission assembly of the hydrostatic transaxle shown in FIG. 1.

At least a portion of charge relief assembly 175 is disposed in the internal void volume formed by ring gear 170 as shown in, e.g., FIG. 2, and charge relief tower 179a extends in an axial direction that is parallel to the axis of rotation of input shaft 128. When trunnion arm 152 is in a neutral position, the force of spring 175b is overcome by hydraulic pressure in charge gallery 179d and hydraulic fluid passes from charge gallery 179d through charge relief passage 179b and into sump 161. Charge pump cover 179 also has mating surface 179f which contacts center section 140 and input shaft clearance pocket 179g to allow clearance of pump input shaft 128 with respect to charge pump cover 179. In the embodiment depicted, charge pump inlet 179c is disposed on one side of the clearance pocket 179g and center passage 179i is disposed on a second side of the clearance pocket 179g opposite the first side.

Figure 7:
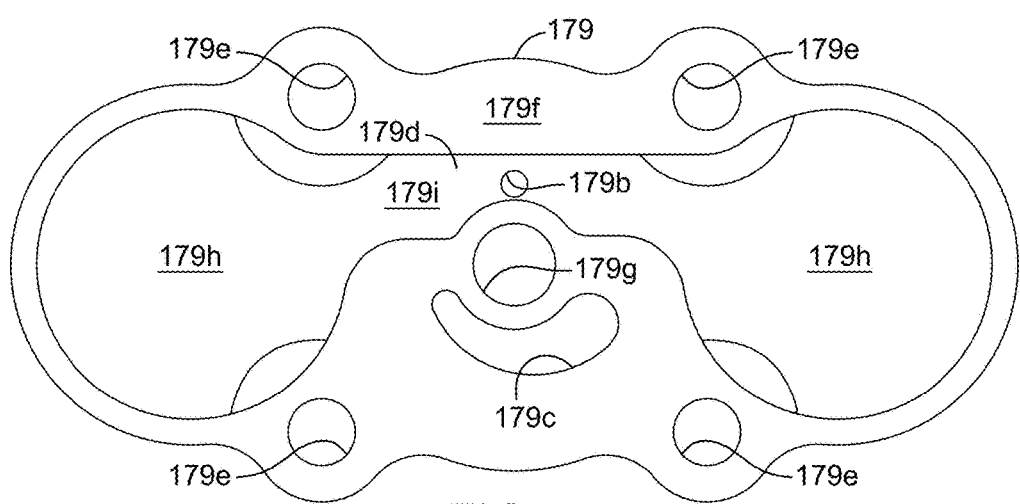
FIG. 7 is a bottom plan view of the opposing side of the cover assembly shown in FIG. 6, rotated about its long axis from the view illustrated in FIG. 6.
Figure 8:
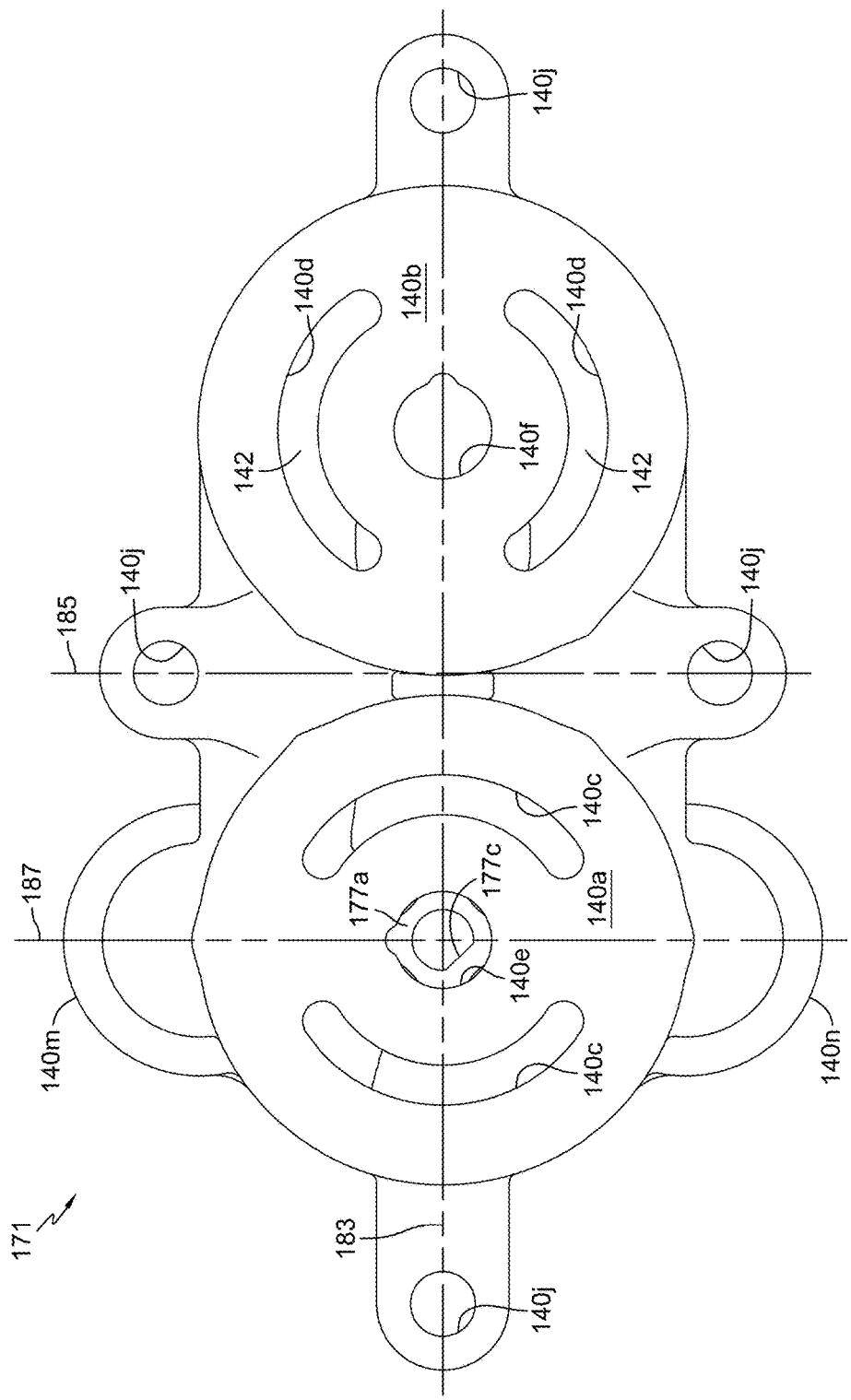
FIG. 8 is a plan view of the opposing side of the center section assembly shown in FIG. 4 rotated about its long axis from the view illustrated in FIG. 4.
Figure 9:
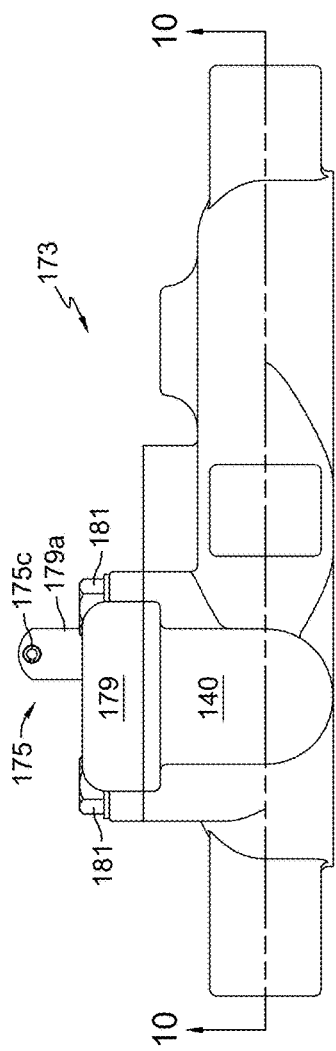
FIG. 9 is a side view of the center section assembly shown in FIG. 4.
Figure 10:
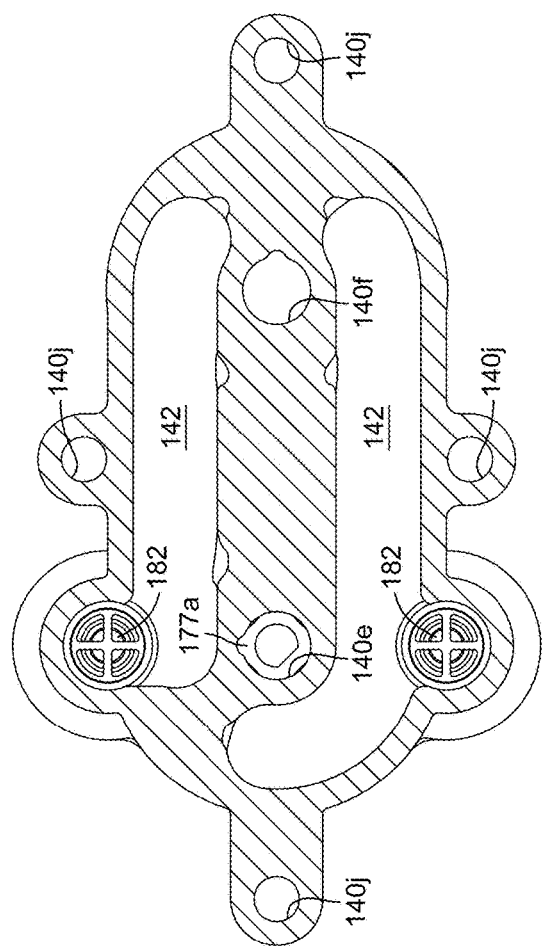
FIG. 10 is a cross-section of the center section assembly shown in FIG. 9, taken along line 10-10.

As seen most clearly in FIG. 8, the centers of the openings for pump input shaft 128, motor output shaft 146, and axle shaft 162, and thus the respective axes of rotation of these shafts, lie in a common plane 183 to minimize size of center section 140. In the embodiment depicted, the centers of two of the mounting openings 140j lie in this same plane 183, whereas the centers of two of the other mounting openings 140j lie in a second plane 185 perpendicular to plane 183. A pair of generally curved projections 140m and 140n extend out from center section 140, corresponding to the ears 179h in charge pump cover 179. Center passage 179i extends in a direction generally perpendicular to plane 183, as seen in FIG. 7, and the center of ears 179h along with the center of the opening in which pump shaft bearing surface 140e is disposed (i.e., the axis of rotation of pump shaft 128) lie in a third plane 187 parallel to second plane 185.

For adjusting the output of hydrostatic transaxle 110, swash plate 154 is in contact with pump thrust bearing 156 against which pump pistons 133 travel as shown in FIG. 2. The direction of rotation of pump cylinder block 132a is fixed by the direction of rotation of input shaft 128, to which pump cylinder block 132a is non-rotatably joined. Pump cylinder block 132a runs on pump running surface 140a, shown in FIG. 8. As will be understood by those of ordinary skill in the art, swash plate 154 may be moved to a variety of positions to vary the displacement of pump pistons 133, the corresponding rotational speed and direction of rotation of motor cylinder block 136a, running on motor running surface 140b of center section 140, and the corresponding output of motor shaft 146. Motor pistons 137 move against motor thrust bearing 158 which is set at a fixed, non-neutral angle of displacement. Movement of the swash plate 154 is accomplished by operator controlled movement of trunnion arm 152 by a control linkage (not shown). Rotation of trunnion arm 152 causes swash plate 154 to swing either fore or aft through an arc to effect displacement of pump pistons 133.

Generally, as the angle of swash plate 154 is varied in one direction from the neutral position, the stroke of the pump pistons 133 is varied, which then drives the motor assembly 136 at a speed determined by the volume of the fluid displaced by the pump pistons 133. As the angle of the swash plate 154 is decreased to pass through the neutral position, the direction of rotation of motor assembly 136 and its corresponding motor output shaft 146 is reversed. The speed of the motor is again determined by the volume of fluid displaced by the pump pistons 133.

Axle shaft 162 is rotationally supported by inner axle bearings 164, set in bearing pocket 140k of center section 140, and outer axle bearings 166. Outer axle bearings 166 are supported by bearing support structure 124a of gear housing 124. To drive axle shaft 162, reduction gearing is provided to couple axle shaft 162 to motor shaft 146, imparting thereto an appropriate speed and torque. Thus, the proximal end of motor shaft 146 is splined to pinion gear 168 which drives ring gear 170. Ring gear 170 in turn drives sun gear 172 which drives planet gears 174. Because the planetary ring gear 178 is held stationary, the planet gears 174 drive planet gear carrier 176 which is splined to axle shaft 162. Other known reduction schemes may be employed to impart an appropriate speed and torque to axle shaft 162. An optional brake rotor 197 can be fixed to motor shaft 146 to provide braking capability if additional brake components (not shown) are also included. As shown most clearly in FIG. 2, the interior or proximal end of axle shaft 162 adjacent bearing 164 is therefore partially disposed within center section 140, and it extends past the proximal end of pump input shaft 128 and also past the proximal end of motor shaft 146 that engages pinion gear 168. All three shafts 128, 146 and 162 therefore overlap to form a more compact unit.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:
1. A drive apparatus comprising:
 a housing defining a sump;
 a center section disposed in the sump and comprising a first side and a second side opposite the first side;

a charge pump disposed on the second side of the center section;

a hydraulic pump assembly disposed on the first side of the center section;

a pump input shaft drivably engaged with the charge pump and with the hydraulic pump assembly;

a charge pump cover engaged with the second side of the center section, the charge pump cover comprising an external surface and an internal surface, wherein the internal surface defines a charge gallery in fluid communication with the charge pump;

a charge relief passage formed on the charge pump cover and in fluid communication with the charge gallery and with the sump; and a charge relief assembly in fluid communication between the sump and the charge gallery, the charge relief assembly comprising a ball and a spring applying a bias force to the ball.

2. The drive apparatus of claim 1, further comprising a hydraulic motor assembly disposed on the first side of the center section and comprising a motor cylinder block driving a motor output shaft.

3. The drive apparatus of claim 2, further comprising an axle extending into the housing and driven by the motor output shaft, wherein a first rotational axis of the pump input shaft, a second rotational axis of the motor output shaft, and a third rotational axis of the axle lie in a common plane.

4. The drive apparatus of claim 3, wherein the center section further comprises a bearing pocket formed in the second side, wherein the axle is supported by the bearing pocket.

5. The drive apparatus of claim 3, wherein the common plane passes through the charge pump.

6. The drive apparatus of claim 1, further comprising a charge relief tower extending from the external surface of the charge pump cover and in fluid communication with the charge relief passage, wherein the ball and the spring are disposed in the charge relief tower.

7. The drive apparatus of claim 6, wherein the spring is retained in the charge relief tower by a pin.

8. The drive apparatus of claim 1, wherein the center section further comprises a charge pump pocket formed in the second side, wherein the charge pump is disposed in the charge pump pocket.

9. A drive apparatus comprising:
a housing defining a sump;
a center section disposed in the sump and comprising a first side, a second side opposite the first side and internal porting in fluid communication with the first side and the second side;
a hydraulic pump assembly comprising a pump cylinder block disposed on the first side of the center section and driven by a pump input shaft extending into the housing and having a first rotational axis;
a charge pump located on the second side of the center section and driven by the pump input shaft;
a hydraulic motor assembly comprising a motor cylinder block disposed on the first side of the center section and in fluid communication with the pump cylinder block via the internal porting;
a motor output shaft driven by the motor cylinder block and having a second rotational axis;

an axle extending into the housing and driven by the motor output shaft, the axle having a third rotational axis, wherein the first rotational axis, the second rotational axis, and third rotational axis lie in a common plane; and a bearing pocket formed in the second side of the center section, wherein an end of the axle is supported by the bearing pocket.

10. The drive apparatus of claim 9, further comprising a charge pump cover engaged with the second side of the center section and disposed adjacent to the bearing pocket, the charge pump cover comprising an external surface and an internal surface opposite the external surface and defining a charge gallery, the charge gallery being in fluid communication with the charge pump and with the internal porting.

11. The drive apparatus of claim 10, wherein the center section further comprises a charge pump pocket formed in the second side, wherein the charge pump is disposed in the charge pump pocket.

12. The charge pump of claim 11, wherein the charge pump is a gerotor charge pump and the common plane passes through the gerotor charge pump.

13. The drive apparatus of claim 10, further comprising a charge relief passage in fluid communication with the charge gallery and with the sump, a charge relief tower extending from the external surface and in fluid communication with the charge relief passage; and a ball and a spring disposed in the charge relief tower.

14. The drive apparatus of claim 13, wherein the spring is retained in the charge relief tower by a pin.

15. The drive apparatus of claim 9, further comprising a brake rotor on the motor output shaft.

16. The drive apparatus of claim 15, wherein the motor output shaft extends entirely through the center section, and the brake rotor is disposed adjacent the second side of the center section.

17. A drive apparatus comprising:
a center section disposed in a sump defined by a housing;
a charge pump disposed on the center section;
hydraulic porting formed in the center section; and
a charge pump cover engaged with the center section to define a charge gallery in fluid communication with the charge pump and comprising:
a pressure relief passage in fluid communication with the sump and with the charge gallery;
a charge relief tower extending away from the center section; and
a charge relief assembly comprising a ball and a spring disposed in the charge relief tower, wherein the spring biases the ball toward the pressure relief passage in the charge pump cover.

18. The charge pump of claim 17, wherein the charge pump is a gerotor charge pump.

19. The drive apparatus of claim 18, further comprising a pump cylinder block rotatably disposed on the center section opposite the charge pump, a motor cylinder block rotatably engaged with the center section and driving a motor output shaft, and a pump input shaft drivably engaged with the charge pump and with the pump cylinder block.

20. The drive apparatus of claim 19, wherein the hydraulic porting is in fluid communication with the charge gallery via a first check valve and a second check valve.

* * * * *